(No Model.)
J. MICHEL, J. T. McDONOUGH & W. L. BOWERS.
FLUSHING TANK FOR CLOSETS.
No. 507,149. Patented Oct. 24, 1893.
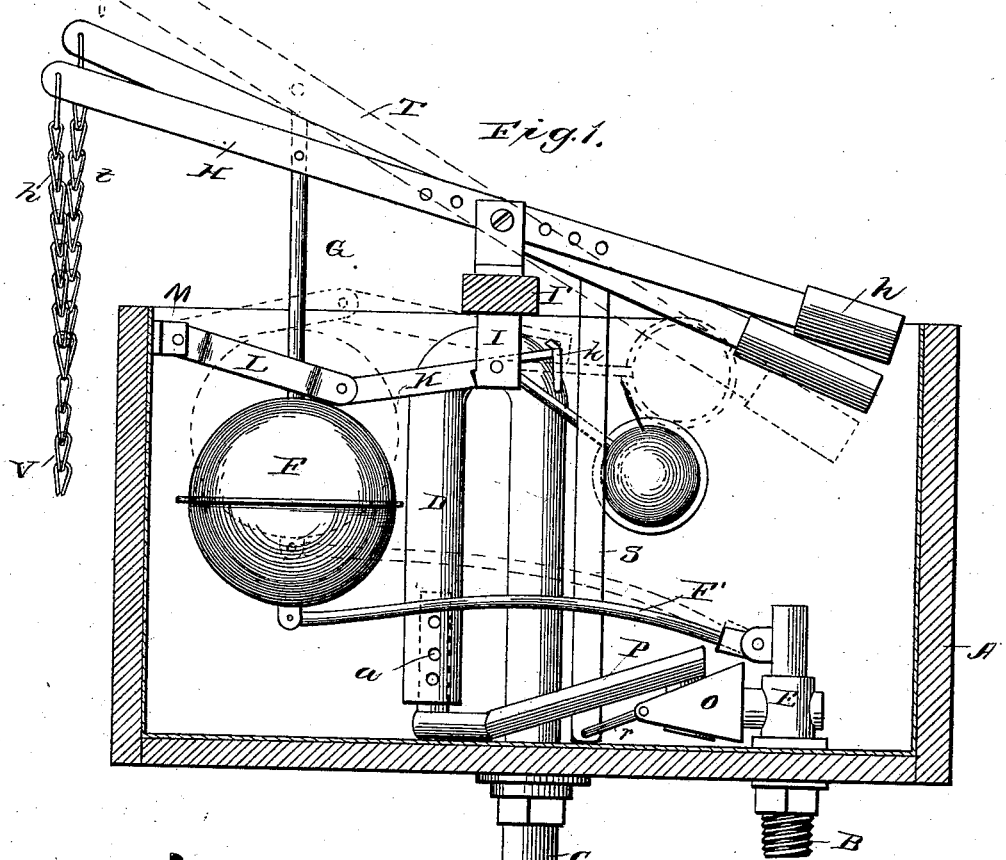
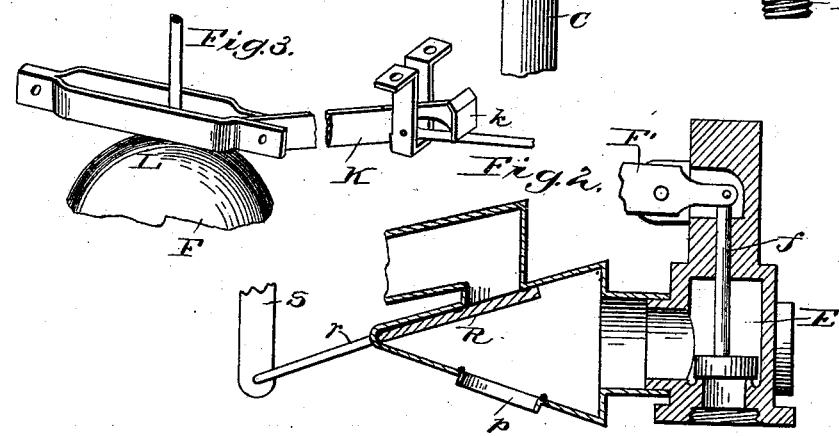
Witnesses
J. M. Fowler Jr.
Aly J. Stewart
Inventors
Joseph Michel, James T.
McDonough & William L.
Bowers
By Louis Reeser,
their Attorney.

UNITED STATES PATENT OFFICE.

JOSEPH MICHEL, JAMES THOMAS McDONOUGH, AND WILLIAM LLOYD BOWERS, OF ST. PAUL, MINNESOTA.

FLUSHING-TANK FOR CLOSETS.

SPECIFICATION forming part of Letters Patent No. 507,149, dated October 24, 1893.

Application filed March 23, 1893. Serial No. 467,285. (No model.)

*To all whom it may concern:*

Be it known that we, JOSEPH MICHEL, JAMES THOMAS McDONOUGH, and WILLIAM LLOYD BOWERS, all of St. Paul, in the county of Ramsey and State of Minnesota, have invented certain new and useful Improvements in Flushing-Tanks for Closets; and we do hereby declare the following to be a full, clear, and exact description of the same, reference being had to the accompanying drawings, forming a part of this specification, and to the letters of reference marked thereon.

This invention relates to improvements in tanks used for flushing purposes, and the improvements are especially, though not exclusively, applicable to what are known as siphon tanks.

The objects of the invention are to provide an improved valve and means for starting the siphon, and further to provide an improved mechanism for cutting off the supply of water by a quick action when the tank is filled, whereby the wearing action of the water on the valve, when almost closed, is prevented.

With these objects in view, the invention consists in certain novel details of construction and combinations and arrangements of parts all as will be now described and pointed out particularly in the appended claims.

Referring to the accompanying drawings: Figure 1 is a sectional view through a tank showing the application of our invention thereto. Fig. 2 is a detail section of the valve showing the gate or valve for directing the water to the siphon or into the bottom of the tank. Fig. 3 is a detail perspective of the catch mechanism.

Like letters of reference in the several figures indicate the same parts.

The letter A indicates the tank proper, which may be of any approved pattern or material and having at a suitable point, preferably near the bottom, a supply pipe B and a discharge pipe C, both of usual construction. From the discharge pipe a goose neck or siphon D extends up to a point near the top of the tank, then down to a point near the bottom, where its mouth may be provided with a series of small apertures $d$. On the supply pipe, there is secured a valve E of usual construction adapted to be closed by the rising of a ball float F connected to the valve stem $f$ by the lever F'. This float ball is connected by a rod G with the pivoted operating lever H, having a weight $h$ at the rear end, and adapted to be drawn down at the forward end by a chain $h'$ to depress the ball float and open the supply valve, and, in order to prevent the said valve from closing gradually, as the water level rises in the tank, and to cause it to rise with a quick sharp action, we provide a catch for holding the ball depressed until the tank is filled to about the required level, and then, by means of a supplemental ball float, release the catch and allow the main float to rise.

In the preferred construction, a depending stop I is secured to the under side of the cross bar I' to which the operating levers are pivoted, and through this depending stop there slides a catch arm K, having a catch $k$ for co-operating with the stop, such arm being pivotally connected at the inner end to a second catch arm L, pivotally connected at M to the side of the tank. The arm L is made double, or, is slotted longitudinally (see Fig. 3) for the passage of the rod G connecting the float F and its operating lever H, thus when the parts are in the position indicated in full lines Fig. 1, the float will strike the under side of the catch arm and will be held down thereby, as the water level rises.

A supplemental float N is pivotally connected to the stop I by means of the arm $n$ in position for said arm, to co-operate with the catch arm as the said supplemental float rises during the filling operation, to release the said arm from the stop, and allow the main float to rise at the proper moment and shut off the supply. For convenience, and to insure the action of the supplemental float, the end of the catch arm is made broad at $k$, as shown in Fig. 3, and thus the supplemental float need not be made to move in tight bearings, which in this class of apparatus is undesirable.

To start the siphon into action when it is desired to empty the tank for flushing purposes, the supply pipe is connected through a three way cock or valve casing O, with the pipe P opening into the lower open end of the siphon as shown clearly in Fig. 1, the other opening for the valve casing leading out at $p$ to the bottom of the tank. The valve lettered R, working in the casing O, is provided with an operating arm $r$, connected by a rod S with the lever T which, for convenience we shall call the supplemental operating lever. This supplemental operating lever is connected by a chain $t$ corresponding to the chain $h'$ with the main operating chain V. Thus both the levers will be drawn down by the main chain, but they are free to return at different times. The rear end of the supplemental operating lever is weighted and in operation, when the two levers are drawn down at the forward end. The main lever momentarily opens the supply pipe, and, the supplemental lever simultaneously shifts the valve R, so as to open the pipe P and close the opening $p$, the result of which is, that the supply is directed into the open end of the siphon, in an upwardly direction, and at once starts it into action causing the tank to be emptied and the floats to drop and open the supply pipe in the ordinary manner. When the chain is released the supplemental operating lever will drop back and close the pipe P and open the opening $p$ causing the water to be discharged into the bottom of the tank. As the floats descend the catch arm follows and the catch thereon, automatically drops into the position indicated in full lines ready to arrest the main float in its upward movement until released by the supplemental float.

The tank is prevented from running over the edge by locating the bend in the siphon below the level of the tank edges and thus, it, in effect, constitutes an efficient overflow pipe.

Having thus described our invention, what we claim as new is—

1. In a flushing tank, the combination with the tank, supply pipe and siphon discharge pipe, of the three way cock connected with the supply pipe, a pipe leading from said three way cock to the siphon discharge pipe and an operating lever for operating the three way cock to direct the supply thereto and initiate the action of the siphon; substantially as described.

2. In a flushing tank, the combination with the tank, the supply pipe, siphon discharge pipe and a pipe connection between the supply pipe and siphon, having a discharge opening in the tank, of a cock for the supply pipe and a cock controlling the pipe connection between the supply pipe and siphon and the opening into the tank and an operating lever for said last mentioned cock; substantially as described.

3. In a flushing tank, the combination with the tank, the supply pipe and cock, the siphon discharge pipe, a pipe connection between the supply cock and siphon with means for diverting the flow from the supply cock to the siphon, of an operating lever for opening the supply cock, a float for closing the cock, a catch for holding the float immersed and a supplemental float for releasing the catch; substantially as described.

4. In a flushing tank, the combination with the tank, the supply pipe and cock, the siphon discharge pipe, a pipe connection between the supply cock and siphon and a cock interposed in said pipe connection to divert the flow from the siphon, of an operating lever opening the supply cock, a float for closing the cock, a catch for holding the float immersed and a supplemental float for releasing the catch; substantially as described.

5. In a flushing tank, the combination with the tank, the supply pipe, a cock controlling the same and an operating lever for opening said cock, of a float for closing the cock, an arm pivotally connected to the side of the tank, a catch arm pivotally connected to the first arm, a stationary stop with which the last mentioned arm cooperates to hold the float immersed and a supplemental float for releasing the catch arm; substantially as described.

In testimony whereof we have hereunto set our hands in presence of two subscribing witnesses.

JOSEPH MICHEL.
JAMES THOMAS McDONOUGH.
WILLIAM LLOYD BOWERS.

Witnesses:
J. C. JENSEN,
H. POTHEN.